United States Patent [19]
Fox et al.

[11] Patent Number: 5,687,163
[45] Date of Patent: Nov. 11, 1997

[54] METHOD AND APPARATUS FOR SIGNAL CLASSIFICATION USING I/Q QUADRANT HISTOGRAM

[75] Inventors: Michael W. Fox, La Jolla; David T. K. Wang, Solana Beach, both of Calif.

[73] Assignee: Cirrus Logic, Inc., Fremont, Calif.

[21] Appl. No.: 476,887

[22] Filed: Jun. 7, 1995

[51] Int. Cl.$^6$ .................................................. H04L 27/34
[52] U.S. Cl. ........................ 370/207; 375/224; 375/235
[58] Field of Search ........................... 370/20, 21, 206, 370/207; 375/224, 225, 235, 236, 340, 343, 344; 455/226.1; 358/406

[56] References Cited

U.S. PATENT DOCUMENTS

| | | |
|---|---|---|
| 4,597,107 | 6/1986 | Ready et al. . |
| 4,686,688 | 8/1987 | Chung et al. ........................ 375/303 |
| 4,860,320 | 8/1989 | Hoffman . |
| 4,910,465 | 3/1990 | Dillman ........................ 328/133 |
| 4,918,708 | 4/1990 | Pottinger et al. . |
| 4,933,958 | 6/1990 | Brandi et al. . |
| 5,019,823 | 5/1991 | Bream et al. . |
| 5,117,440 | 5/1992 | Smith et al. ........................ 375/328 |
| 5,134,634 | 7/1992 | Yoshida . |
| 5,247,308 | 9/1993 | Konig . |
| 5,339,040 | 8/1994 | Loper . |
| 5,381,450 | 1/1995 | Lane et al. . |
| 5,402,449 | 3/1995 | Schultes et al. . |

*Primary Examiner*—Melvin Marcelo
*Attorney, Agent, or Firm*—Bruce W. Greenhaus; Martin J. Jaquez

[57] ABSTRACT

An efficient method and apparatus for determining, recording, and analyzing the phase history of a Line-in signal. The Line-in signal is coupled to a conventional demodulator. I and Q components are output by the conventional demodulator and coupled to an IQ quantizer. The IQ quantizer determines a quadrant on an I/Q plot from the amplitude of each component. A histogram is generated which indicates in which quadrant the Line-in signal was for a first sample, and in which quadrant the Line-in signal was for a second sample, the second sample having been taken immediately after the first sample. From this histogram, the number of times the Line-in signal transitions from one quadrant to another over a predetermined period of time is known. If the number of times the input signal crosses one of the axis of the I/Q plot in a first direction is greater than the number of times the input signal crosses that axis in the opposite direction, then the frequency of the Line-in signal differs from the frequency of the In-phase reference signal and the Quadrature reference signal. The frequency of the Line-in signal is directly related to the difference between the number of times the signal crosses an axis of the I/Q plot in a first direction, minus the number of time the signal crosses that axis of the I/Q plot in the opposite direction. The present invention also determines whether the Line-in signal represents a particular signaling pattern, such as the well-known AA pattern defined in the V.32 standard.

28 Claims, 7 Drawing Sheets

|       | $Q_0$ | $Q_1$ | $Q_2$ | $Q_3$ |
|-------|-------|-------|-------|-------|
| $Q_0$ | 0     | 1     | 2     | 3     |
| $Q_1$ | 4     | 5     | 6     | 7     |
| $Q_2$ | 8     | 9     | 10    | 11    |
| $Q_3$ | 12    | 13    | 14    | 15    |

FIG. 5

METHOD AND APPARATUS FOR SIGNAL CLASSIFICATION USING I/Q QUADRANT HISTOGRAM

BACKGROUND OF THE INVENTION

1. Field of the Invention

This invention relates to a signal classification, and more particularly, to a method and apparatus for determining, recording and analyzing the phase history of a signal.

2. Description of Related Art

An analysis of the nature of a signal can provide a great amount of benefit in a number of applications. For example, there are presently a number of standards to which manufacturers of communications equipment (such as data modulator/demodulators (i.e., "modems") and facsimile modems) adhere. By analyzing the phase history of a signal, the particular standard to which the signal adheres may be determined. The International Telecommunications Union (ITU) (formerly CCITT) has generated many standards (such as V.22, V.21, V.27, V.32, V.32 bis, etc.) to which device manufactures (such as modem and fax manufacturers) design their equipment. These standards commonly define a particular scheme for modulating information to be transmitted over a modem. For example, in accordance with V.32, an 1800 Hz carrier is modulated using quadrature amplitude modulation (QAM).

The modulated tone is typically represented by a pulse code modulation (PCM) signal. In accordance with well-known PCM techniques, a series of digital symbols (such as 8-bit words) represent the amplitude of the signal at particular moments in time. Accordingly, to decode a modem signal using PCM techniques, the signal is sampled at a rate (T), where 1/T is greater than 2f, f being the highest frequency of the signal. Each sample is digitized (i.e., the amplitude of the signal at the time the sample is taken is represented by a digital symbol). The resulting PCM signal is a stream of digital symbols that represent the amplitude of the input signal over a period of time. If the receiving equipment is designed to receive a signal which has been encoded in accordance with the V.32 standard, then the information that is transmitted can be decoded and made intelligible.

There are a number of standards that are commonly used to encode data today. For example, images are transmitted using facsimile standards such as V.21, V.27, and V.29, while data is often transmitted using V.22, V.22 bis, and V.32. Often, if equipment is designed to receive and transmit information in accordance with one or more of the standards that are currently in use, the equipment must be able to distinguish to which particular standard the equipment at the other end of the communications link is conforming. For example, assume that a first modem attempts to call a second modem using V.22 standard transmissions. Assume further that the second modem is capable of communicating in accordance with both V.32 and V.22 standards. Even though the second modem is capable of communicating in accordance with both V.32 and V.22, the second modem must be capable of determining that the first modem is using the V.22 standard.

In accordance with one method for determining to which standard a device is conforming, the received signal is analyzed to determine the presence of a characteristic frequency. In many cases, the characteristic frequency can be determined by measuring the amount of energy that is present at the characteristic frequency. The characteristic frequency depends on the carrier and the modulated signal.

In accordance with one technique, one filter can be tuned to each characteristic frequency that is expected. For example, a first FIR (finite impulse response) filters tuned to 1800 Hz is used to detect the amount of energy in an incoming signal at the characteristic frequency for a signal that has been modulated in accordance with V.32 AA signal. A second filter, tuned to 1300 Hz may be used to detect the amount of energy in the incoming signal at the characteristic frequency for a signal that has been modulated in accordance with V.23. Likewise, filters tuned to 2225 Hz and 1650 Hz may be tuned to detect V.22 and V.21 signals. This technique requires a substantial amount of overhead (either hardware or software) to implement the filters to perform the frequency analysis.

In accordance with another method used to determine to which particular standard a device is conforming, the incoming signal is demodulated in accordance with each of the standards which the particular receiving device is capable of accommodating. Accordingly, if the device is capable of receiving information that is communicated in accordance with V.21, V.22 bis, V.23, and V.32, then the processor must attempt to demodulate the signal in accordance with each of these standards. The particular standard that yields intelligible information for a predetermined time is then considered to be the standard to which the transmitting device is conforming. A great mount of overhead (either software or hardware) is required to concurrently demodulate multiple signals in order to determine to which standard the signals comply.

Another example of a situation in which characteristics of a signal must be determined is provided by systems which detect and classify dual tone multi-frequency (DTMF) signals. For example, many systems in use today rely on the ability of a processor to detect the DTMF signals generated by a conventional touch-tone telephone. A unique DTMF signal having two tones is generated for each of the numbered buttons. One method for determining the DTMF signal requires filtering the signal to determine amount of energy in each possible DTMF frequency. By detecting which two frequencies have the most energy, the detector can distinguish one DTMF signal from another. Accordingly, 16 filters are required to distinguish each possible DTMF tone.

In order to reduce costs and complexity of detectors that rely upon the characteristics of an incoming electrical signal, it would be desirable to reduce the amount of overhead required by prior art methods of, and apparatuses for, analyzing such signals. For example, it would be desirable to provide a relatively low overhead method and apparatus for determining to which standard to conform in communicating with a remote device that may be communicating in accordance with any one of a number of standards. The present invention provides a method and apparatus for storing and analyzing the phase history of a signal in order to determine the nature of that signal.

SUMMARY OF THE INVENTION

The present invention provides an efficient method and apparatus for determining, recording, and analyzing the phase history of a signal, such as an electrical input signal (i.e., the "Line-in" signal). In accordance with one embodiment of the present invention, the Line-in signal is received as a pulse code modulated (PCM) signal.

In accordance with the present invention, the Line-in signal is coupled to a conventional V.32 compliant demodulator. Preferably, the conventional demodulator demodulates the Line-in signal for both the present invention, as well as a conventional device, such as a modem or facsimile (fax) machine. Alternatively, the Line-in signal is coupled to a dedicated first and second frequency mixer. An "In-phase" reference signal, having a generally pure sinusoidal characteristic, is coupled to the second input to the first mixer. In accordance with one embodiment of the present invention, the In-phase reference signal is a PCM signal. The output of the first mixer is referred to as the "I component" of the Line-in signal. A "Quadrature" reference signal is coupled to the second input to the second mixer.

In accordance with one embodiment of the present invention, the Quadrature reference signal is a PCM representation of a pure sinusoidal input at the same frequency as the In-phase reference signal, but which leads the In-phase reference signal by 90°. The output of the second mixer is referred to as the "Q component" of the Line-in signal. Each mixer is preferably associated with a bandpass filter. The output from each mixer is coupled to the input of the associated bandpass filter. Each filter reduces undesirable mixing products.

In the preferred embodiment, the I and Q component are output by the conventional V.32 compliant demodulator and coupled to an IQ quantizer. Alternatively, the I and Q components output from each filter are coupled to an IQ quantizer. The IQ Quantizer determines into which of four possible quadrants the input signal falls. In one embodiment of the present invention, the IQ quantizer preferably receives the I and Q components and determines the amplitude of each component. If the amplitudes of both the I component and the Q component are positive, then the Line-in signal is considered to be in the first quadrant ($Q_0$) of a Cartesian plot of the I and Q components of the Line-in signal (i.e., an "I/Q" plot). Alternatively, if the amplitude of both the I and Q components of the Line-in signal are negative, then the Line-in signal is considered to be in the fourth quadrant ($Q_3$) of I/Q plot. If the amplitude of the I component is negative and the amplitude of the Q component is positive, then the Line-in signal is considered to be in the second quadrant ($Q_1$), and if the amplitude of the in-phase component is positive and the amplitude of the quadrature component is negative, then the Line-in signal is considered to be in the third quadrant ($Q_2$).

In accordance with the present invention, a histogram is generated which indicates in which quadrant the Line-in signal was for a first sample, and in which quadrant the Line-in signal was for a second sample, the second sample having been taken immediately after the first sample. From this histogram, the number of times the demodulated Line-in signal transitions from one quadrant to another over a predetermined period of time is known. The number of times the Line-in signal transitions from one quadrant to another is used by the present invention to determine whether the Line-in signal represents a particular signaling pattern, such as the well-known AA pattern defined in the V.32 standard.

The derails of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIGS. 4 and 5 illustrate the relationship between quadrants and counters.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

The present invention provides an efficient method and apparatus for determining, recording, and analyzing the phase history of an input signal, such as an electrical quadrature amplitude modulation (QAM).

Basic Architecture of the Present Invention

Figure 1:
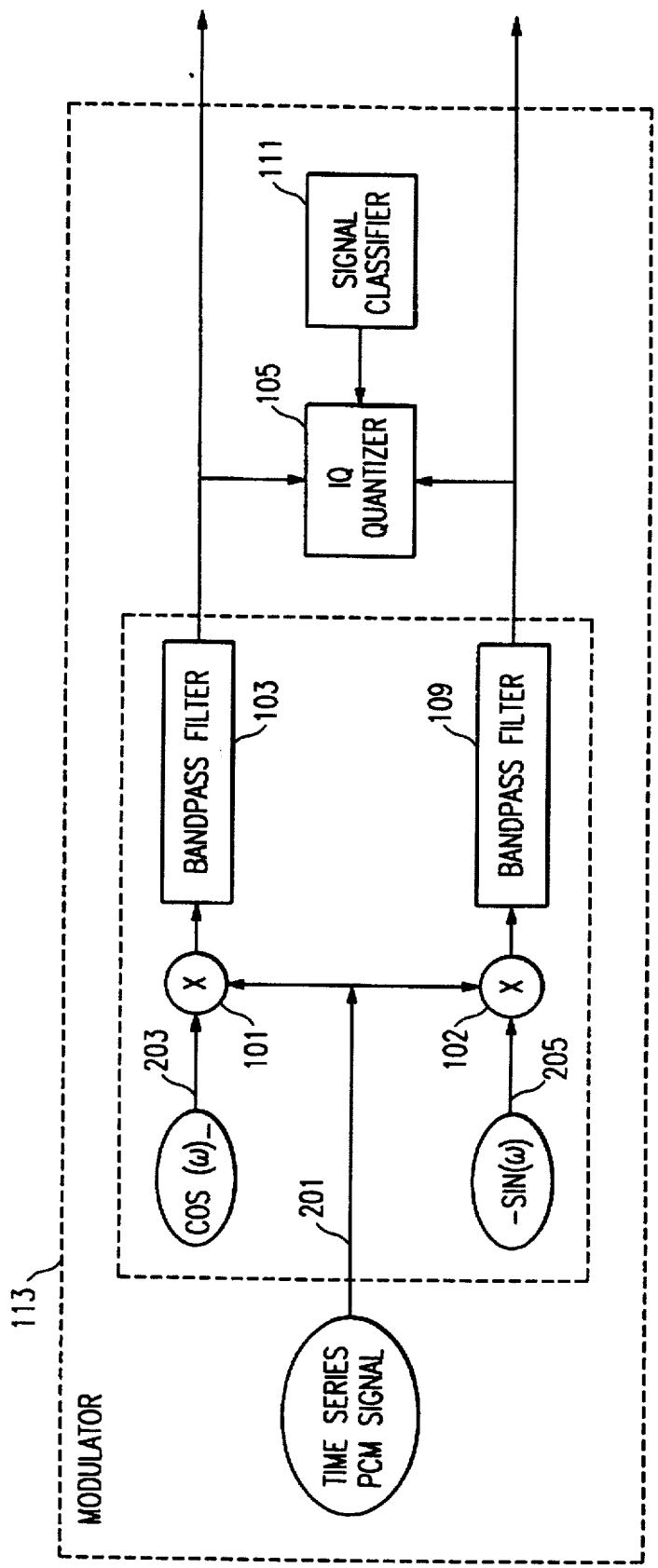
FIG. 1 is a simplified block diagram of one embodiment of the present invention.

FIG. 1 is a simplified block diagram of one embodiment of the present invention. A "Line-in" signal, such as QAM pulse code modulated (PCM) input signal, is coupled to a demodulator 113. In the preferred embodiment of the present invention, the demodulator 113 is a conventional V.32 compliant demodulator. When the present invention is used in a conventional data modem or fax modem, the same demodulator circuitry used to demodulate the input signal for the modem or fax machine is used to provide input signals to the present invention. A local controller (not shown), such as a processor or state machine within the modulator 113 is responsible for outputting an in-phase ("I") component and a quadrature ("Q") component. In one embodiment, the conventional modulator outputs the I and Q components upon receipt by the controller of a request. In an alternative embodiment, the demodulator 113 may be dedicated to the present invention.

For ease of understanding, FIG. 1 shows a simplified representation of the components of a modulator 113. The Line-in signal is coupled to a first input to a first phase detector (such as a frequency mixer) 101. A first reference signal (the "In-phase" reference signal) is applied to a second input to the first mixer 101. In accordance with one embodiment of the present invention, the In-phase reference signal is an 1800 Hz PCM signal. In one embodiment of the present invention, the In-phase reference signal is a PCM representation of a pure sinusoidal signal. The reference signals of the preferred embodiment of the present invention are not phase locked to the incoming signal. Therefore, the particular phase relationship between the Line-in signal, and the in-phase reference signal and quadrature reference signal is essentially arbitrary.

In the preferred embodiment of the present invention, the output from the mixer 101 is a discrete time series of values, the amplitude of which represents the phase of the first input to the mixer 101 with respect to the phase of the second input to the mixer 101. For example, if the present invention is used to determine the type of modulation being used by a transmitting modem or fax machine, then the In-phase reference signal is preferably a purely sinusoidal 1800 Hz PCM signal. In this example, the output of the mixer 101 is a direct current (DC) signal if the Line-in signal is an "AA" pattern modulated in accordance with the well-known ITU V.32 recommendations. That is, V.32 signals are required to be phase modulated signals with a carrier frequency of 1800 Hz. For an AA pattern, the phase of the carrier is held constant. Therefore, since both the In-phase reference signal and the Line-in signal have a frequency of 1800 Hz and the phase relationship is constant, the output from the mixer 101 is a DC voltage that is equal to the difference between the phase of the In-phase reference signal and the phase of the input signal.

The output from the mixer 101 is preferably coupled to a bandpass filter (i.e., the "In-phase Filter") 103. The In-phase Filter 103 in accordance with one embodiment of the present invention is a square root of 12.5 percent raised cosine, bandpass filter. The In-phase Filter eliminates any undesired mixer products that are generated by the mixer 101. In addition, in one embodiment of the present invention, the In-phase Filter 103 is sufficiently narrow to reduce out of band noise. For example, assume that the carriers associated with the particular modulation techniques expected to be used to modulate the Line-in signal are all within a relatively narrow range of frequencies. Any output from the mixer 101 which has a frequency that is higher than the difference between the In-phase reference signal and either the highest or lowest frequency associated with a carrier can be assumed to be unrelated to a carrier of interest. Accordingly, such high frequencies are preferably filtered from the output of the mixer 101. Accordingly, the modulator 113 outputs an I component to be used by the present inventive method and apparatus to determine the phase history of the Line-in signal.

A second phase detector 102 (i.e., such as a mixer) also receives the Line-in signal at a first input. A second input to the second mixer 102 is a second reference signal (i.e., the "quadrature" reference signal) which has the same frequency as the In-phase reference signal. The phase of the Quadrature reference signal is offset from the phase of the In-phase reference signal by 90°. The output from the second mixer 102 is coupled to a "quadrature filter" 109, which is preferably essentially the same as the In-phase Filter 103. Accordingly, the modulator 113 outputs a Q component to be used together with the I component to determine the phase history of the Line-in signal.

Figure 2:
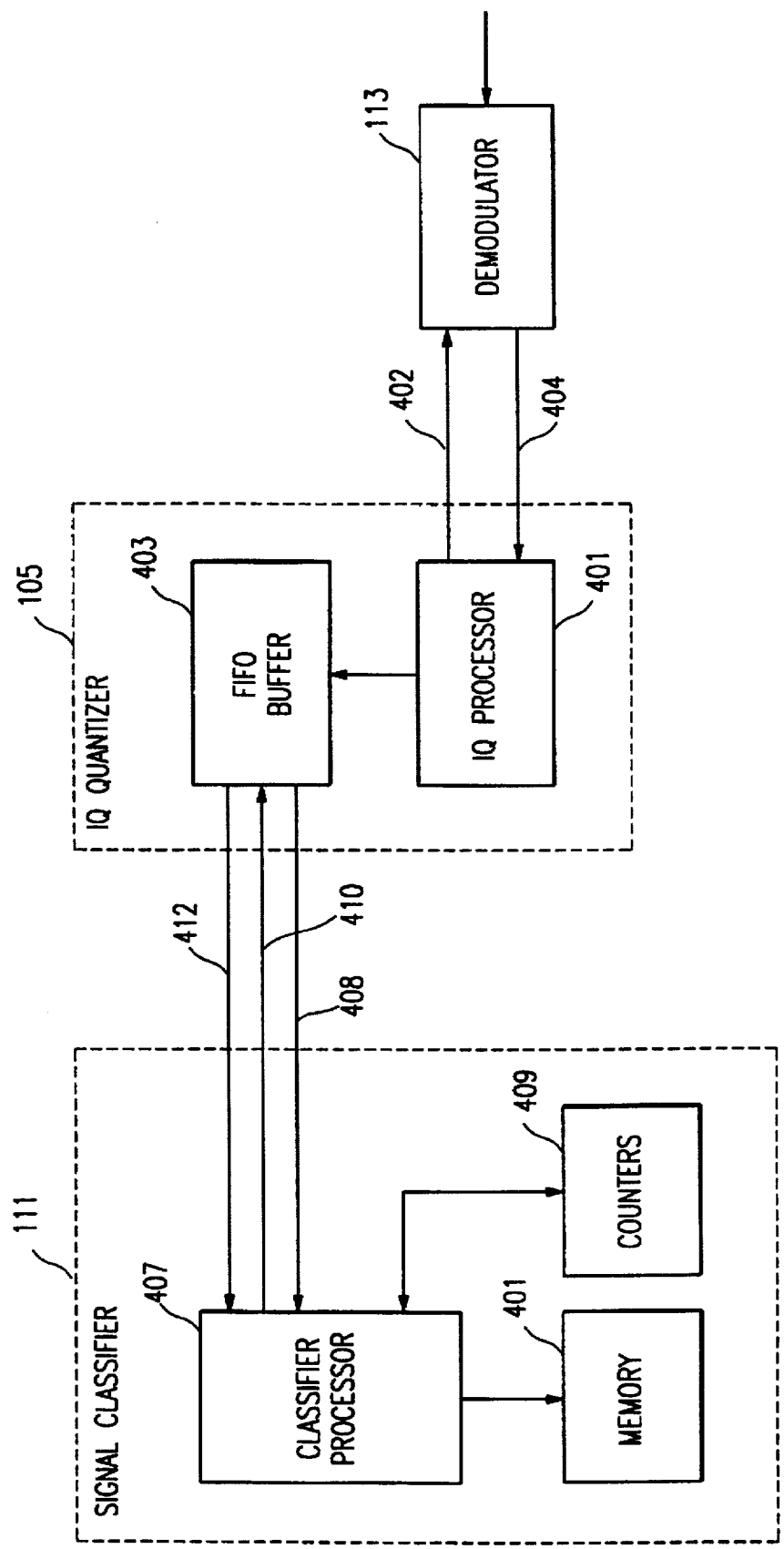
FIG. 2 is a simplified block diagram of the IQ quantizer and the Signal Classifier.

The I component and the Q component output from the modulator 113 are coupled to a first and a second input of an IQ quantizer 105. FIG. 2 is a simplified block diagram of the IQ quantizer 105 and the Signal Classifier 111. The IQ quantizer 105 includes a control device, such as a Histogram Processor 401, and a first-in first-out (FIFO) circuit 403. The FIFO buffer 403 stores "Area Indicators". Area indicators identify a particular area (i.e., region) of a signal space, such as an IQ space. For example, in the preferred embodiment the Area Indicators are 2-digit binary symbols ("dibits") which identify one of four particular quadrants within the IQ signal space. In the preferred embodiment, the FIFO buffer 403 is a 4-bit FIFO which is capable of storing two dibits. Alternatively, the FIFO buffer 403 stores more than two Area Indicators. Furthermore, in alterative embodiments of the present invention, the Area Indicators may have more than two bits to indicate one of the plurality of areas within the signal space. For example, Area Indicators may have 5 bits used to indicate one of 32 wedges of signal space as defined by a pair of angles and a vector length. It will be understood by those skilled in the art that the shape of each particular area identified by an Area Indicator is arbitrarily defined. That is, each area of the signal space that is identified by an Area Indicator may be a different shape and size.

In the preferred embodiment, the Signal Classifier 111 includes a controller, such as a Classifier Processor 407, a plurality of Histogram Counters 409, and a memory/storage device 411. The memory device preferably stores the program instructions that are executed by the Classifier Processor 407.

In one embodiment of the present invention, the demodulator 113 is a conventional V.32 compliant demodulator. The IQ quantizer 105 requests the I and Q components from the demodulator 113 at a rate of 9,600 samples per second. Requests are communicated to the demodulator 113 over a signal line 402. This rate is preferred for compatibility with the rate at which many conventional modems operate. That is, conventional modems operate at fractions of 9,600 symbols per second. Accordingly, 96 samples are collected by the IQ quantizer 105 over a signal line 404 every 10 ms. In an alternative embodiment, the output of the filter may be sampled at any rate above the Nyquist rate (i.e., that is, at least twice the rate of the highest frequency present after filtering). Once the Histogram Processor 401 requests an I component and a Q component from the demodulator 113, the demodulator 113 preferably returns two values which represent the amplitude of the I and Q components of the Line-in signal. Alternatively, the I and Q components are received by the Histogram Processor 401 directly from the mixers 101, 102 or the bandpass filters 103, 109 of the demodulator 113 shown in FIG. 1.

Regardless of whether the I and Q components are received by the Histogram Processor 401 from a conventional demodulator, from the mixers 101, 102, or directly from the bandpass filters 103, 109, the Histogram Processor 401 converts the I and Q components into an Area Indicator, such as a dibit. In the preferred embodiment of the present invention, each bit of the dibit directly corresponds with either the I component or the Q component. For example, in accordance with the preferred embodiment of the present invention, the first bit of a dibit corresponds with the Q component, such that the most significant bit is not asserted if the amplitude of the Q component is positive, and is asserted if the amplitude of the Q component is negative. Likewise, the least significant bit of the dibit is not asserted if amplitude of the I component is positive, and is asserted if the amplitude of the least significant bit is negative. In an alternative embodiment in which the demodulator 413 is capable of generating a dibit, the Histogram Processor 401 requests a dibit directly from the demodulator 413.

Each Area Indicator is loaded into the FIFO buffer 403 and pushes the previously loaded Area Indicator into the most significant location of the FIFO Buffer 403. This process of loading each Area Indicator generates a "Transition Indicator". In the preferred embodiment of the present invention, the Transition Indicator is a "quadbit". That is, by loading a dibit into the FIFO Buffer 403 while a previously loaded dibit is present in the FIFO Buffer 403, the previously loaded dibit is concatenated with the newly loaded dibit to form a 4-bit quadbit. Quadbits are discussed in greater detail below. The contents of the FIFO buffer 403 are then communicated to the Classifier Processor 407 over signal lines 412. As the Classifier processor 407 receives each Transition Indicator from the FIFO buffer 403, the Classifier Processor 407 preferably increments one of the counters 409. Each counter 409 is associated with one of the Transition Indicators. In the preferred embodiment in which the Transition Indicators are quadbits, each counter is associated with one of the 16 possible quadbit values. In an alternative embodiment of the present invention, the counters are decremented.

In one embodiment of the present invention, more than one Area Indicator may be concatenated in the buffer 403 to generate a Transition Indicator with more than four bits. In such an embodiment, the number of counters is preferably equal to the number of possible values that the Transition Indicator may assume. For example, if the Transition Indicator within the buffer 403 is 6 bits long, then there are 64 counters required to account for each of the 64 possible combinations of 6 binary digits.

Operation of the Present Invention

In accordance with the present invention, the output from the demodulator 113 determines the instantaneous phase of the input Line-in signal with respect to In-phase and Quadrature reference signals. It will be understood that the portion of the present invention which determines the particular phase relationship between the Line-in signal 201 and the two reference signals 203, 205 is essentially the same as the demodulator of a conventional V.32 modem or fax machine. In fact, when the present invention is used as a component of a conventional modem and fax machine, the conventional data demodulator or fax machine demodulator is preferably used to perform the above. However, in a conventional demodulator, the carrier frequency must be known. Also, the reference frequencies must be equal to the carrier frequency. In accordance with the present invention, the carrier frequency of the Line-in signal 201 is initially unknown, and the reference signals 203, 205 may have different frequencies from the carrier frequency of the Line-in signal 201. A V.32 compliant demodulator is preferred for use in the present invention, since the V.32 compliant demodulator is capable of operating over the range of 600 Hz to 3000 Hz.

Since the reference is not phase locked to the Line-in signal, the particular symbol that is represented by each point 301, 303, 305, 307 is not known. However, by plotting each sample taken by the IQ quantizer 105 for a plurality of time intervals, the Signal Classifier 111 can determine a number of characteristics related to the incoming signal. These determinations can be made with relative ease (i.e., with relatively little dedicated hardware and few programmed instructions being executed). One of the advantages of the present invention is a reduction in overhead required to determine phase related characteristics of the Line-in signal.

Operation of the IQ Quantizer in Accordance with One Embodiment

In accordance with one embodiment of the present invention, the IQ quantizer 205 receives a stream of pairs of I and Q values (i.e., the amplitude of the I and Q components). The IQ quantizer 205 determines in which quadrant 309, 311, 313, 315 of the I/Q plot each pair of I and Q components reside. For example, if the amplitudes of both the I and Q components are positive (i.e., the Line-in signal 201 is between 180° out of phase with the In-phase reference signal 203 and 90° ahead of the In-phase reference signal 203), then the Line-in signal is considered to be in the first quadrant 309 of the I/Q plot. Alternatively, if the amplitude of both the I and Q components of the Line-in signal are negative, then the Line-in signal 201 is considered to be in the fourth quadrant 313 of the I/Q plot. If the amplitude of the I component is negative and the amplitude of the Q component is positive, then the Line-in signal is considered to be in the second quadrant 315. If the amplitude of the in-phase component is positive and the amplitude of the quadrature component is negative, then the Line-in signal is considered to be in the third quadrant 311.

In accordance with the preferred embodiment of the present invention, the IQ quantizer 205 generates a dibit (as described above) which indicates which quadrant the Line-in signal resides. Accordingly, an ordered sequence of dibits is generated, such that there is one dibit for each pair of I and Q values provided to the IQ quantizer 205. For example, for I and Q values that reside within the first quadrant 309, the IQ quantizer 205 generates a dibit value of "00". For I and Q values that reside within the second quadrant 315, the IQ quantizer 205 generates a dibit value of "01". For I and Q values that reside within the third quadrant 311, the IQ quantizer 205 generates a dibit value of "10". For I and Q values that reside within the fourth quadrant 313, the IQ quantizer 205 generates a dibit value of "11". As stated previously, in an alternative embodiment of the present invention, a conventional demodulator generates the dibits.

Once the two dibits have been generated, the IQ quantizer 205 generates a quadbit that includes both of the dibits. A quadbit is a four digit binary value associated with a pair of adjacent dibits within the sequence of dibits. The first two bits of the quadbit are equal to the value of the first dibit of the pair, and the second two bit of the quadbit are equal to the second dibit of the pair. Accordingly, each quadbit indicates a change in the phase of the Line-in signal 201 with respect to the reference signals 203, 205 (i.e., movement of the Line-in signal 201 from one quadrant to another in the time between the first sample being taken and the second sample being taken). For example, assume that a first pair of I and Q values provided to the IQ quantizer 205 includes a positive I and negative Q value, then a dibit value of "10" is generated for the pair. If a second pair of I and Q values provided to the IQ quantizer 205 includes a negative I and positive Q value, then the IQ quantizer 205 generates a dibit equal to "01" for the second pair of I and Q values. A quadbit associated with the first and second dibits is then generated which is equal to "1001" (i.e., the concatenation of the first dibit with the second dibit). The quadbit "1001" indicates a to sample record of the changes in phase of the Line-in signal 201. If a third pair of I and Q values provided to the IQ quantizer 205 includes a positive I and negative Q value, then a dibit value of "10" is generated for the third pair. Accordingly, the second quadbit would be equal to "0110" (i.e, the concatenation of the second dibit with the third dibit). Each quadbit is used to address a histogram location at which a counter value is incremented. Typically this address is added to an offset base.

Operation of the Classifier in Accordance with One Embodiment

Once the FIFO Buffer 403 has a predetermined number of quadbits stored therein, the Classifier Processor 407 reads the quadbits from the FIFO Buffer 403. Each quadbit value is associated with one of sixteen counters included in the Signal Classifier 407. For example, the quadbit value "0000" is associated with a first counter, the value "0001" is associated with a second counter, the value "0010" is associated with a third counter, etc. Each time the Classifier Processor 407 reads a quadbit from the FIFO buffer 403, the Classifier Processor 407 causes the counter associated with the value of that quadbit to be incremented. Thus, each counter determines the number of times the Line-in signal has moved from one predetermined quadrant to the another predetermined quadrant in the time between adjacent samples. In accordance with one embodiment of the present invention, each counter is a discrete hardware device which receives an increment signal. In one alternative embodiment, each counter is a software counter. That is, each counter is a memory location which holds a count value. The Classifier Processor 407 increments the count value by overwriting the value with a value that is one greater than the previous value.

Figure 4:
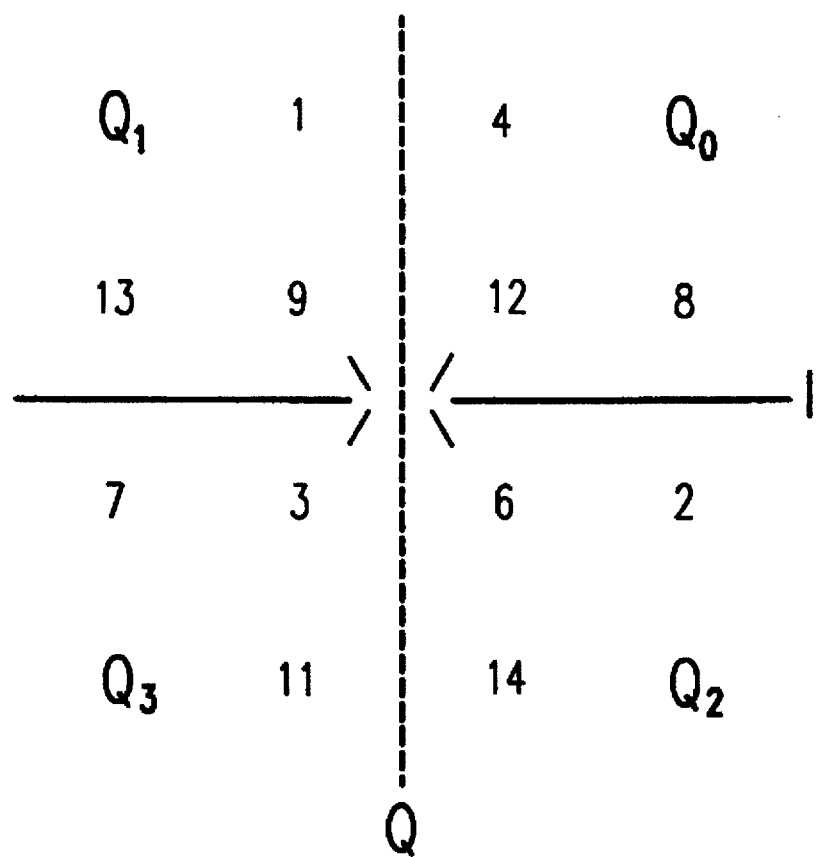

FIGS. 4 and 5 illustrate of the relationship between quadrants and counters. That is, the letters $Q_1$, $Q_2$, $Q_3$, and $Q_4$ indicate the quadrant indicated by a first dibit of a quadbit (i.e., the two least significant digits of the quadbit). In FIG. 4, the numbers shown adjacent to each letter in each quadrant illustrate which counter is associated with a particular change in phase and quadbit value. For example, if a quadbit is "0001", then the first dibit of the quadbit is 01 (representing quadrant $Q_1$), and the second dibit of the quadbit is 00 (representing $Q_0$). In accordance with the embodiment shown, $Q_0$ is the top right quadrant. Accordingly, in FIG. 4, the number in the top right of quadrant $Q_1$ is the number of the counter associated with the quadbit "0001". Accordingly, the counter associated with the value "1" is incremented. If a quadbit is "0100", then the first dibit of a quadbit is 00 (representing quadrant $Q_0$), and the second dibit of the quadbit is 01 (representing $Q_1$). In accordance with the embodiment shown, $Q_1$ is the top left quadrant. Accordingly, in FIG. 4, the number in the top left of quadrant $Q_0$ is the number of the counter associated with the quadbit "0100". Accordingly, the counter associated with the value "4" is incremented. Note that due to the dibit assignments for each quadrant, the counter to be incremented is that counter that has the value of the 4-bit quadbit.

Also, in FIG. 5, following the column headed by $Q_0$ to the row beside $Q_2$ the number "8" is found. If the quadbit is "1111", then the first dibit is "11" (representing $Q_3$) and the second dibit is also "11" (representing ($Q_3$). In this case, the Line-in signal did not change phase with respect to the reference signals. Therefore, the two dibits of the quadbit are the same. The table provided in FIG. 5 illustrates which counter is associated with the quadbit "1111". Notice that each of the numbers on the diagonal from top-left to bottom-right are associated with a quadbit in which the first and second dibits are equal. Accordingly, the counter associated with the quadbit "1111" is 15.

Figure 6A:
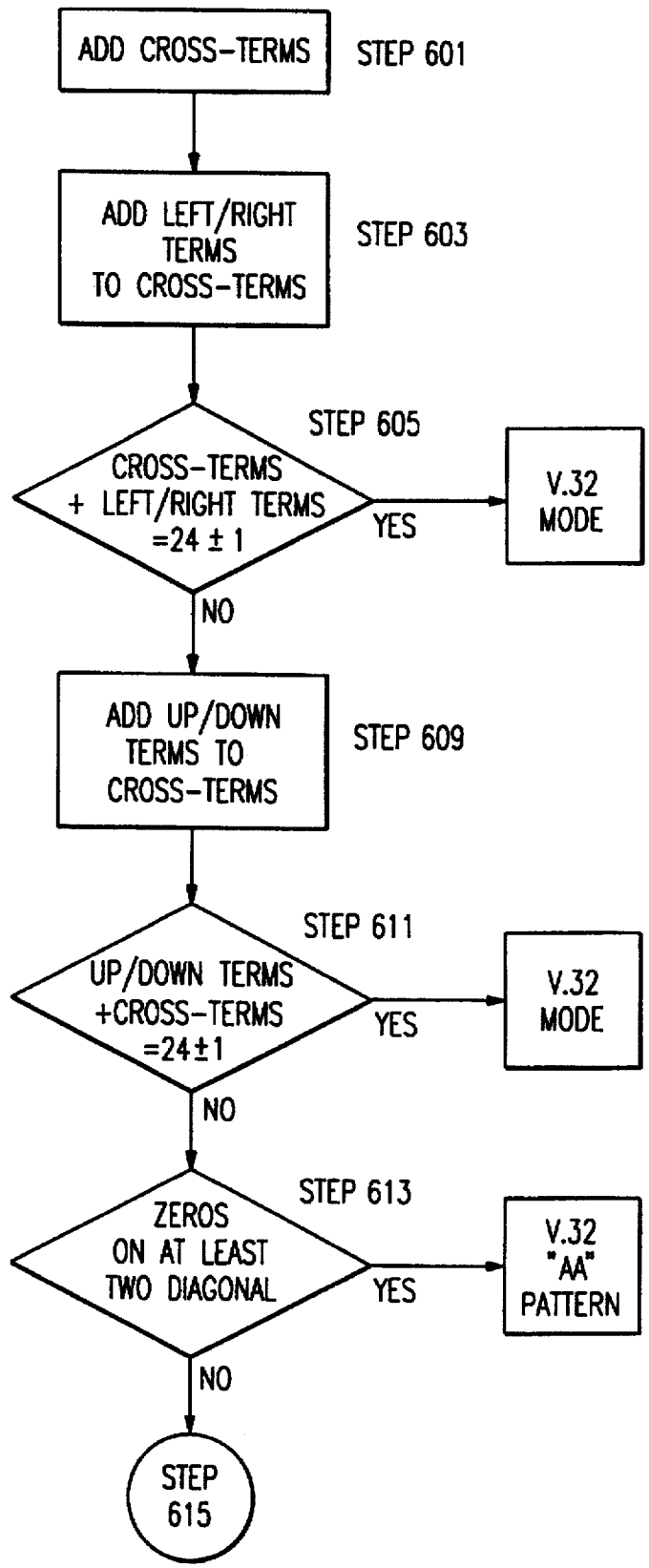
FIGS. 6a and 6b are a flowchart of one method in accordance with the present invention.
Figure 6B:
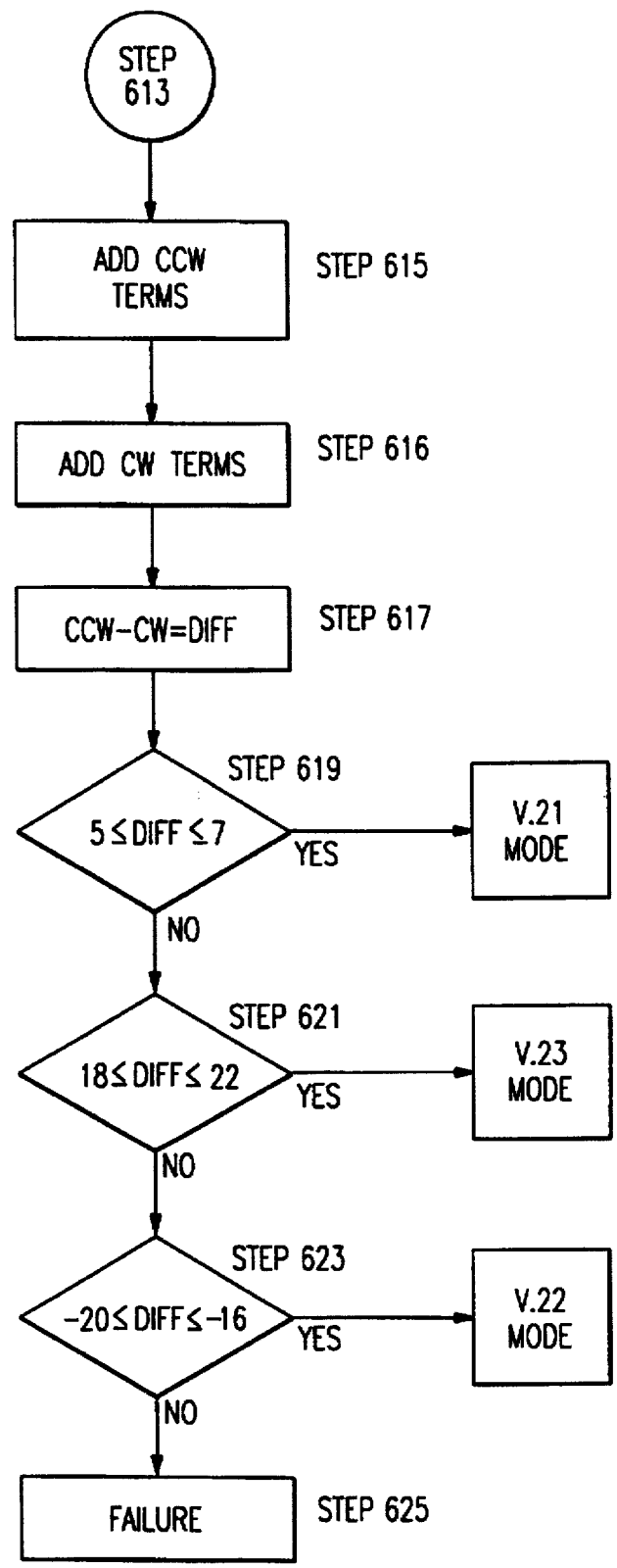

Once the Signal Classifier 407 has read a predetermined number of samples, taken over a predetermined amount of time (i.e., 96 quadbits generated from 97 pairs of I and Q component values taken over a sample period of 10 ms in the preferred embodiment of the present invention) and incremented each of the counters associated with each quadbit, the Signal Classifier 111 analyzes the values in the counter to determine the relationship between the Line-in signal and the reference signals. For example, in one embodiment of the present invention in which the reference frequencies are each 1800 Hz, the Signal Classifier 111 determines with which particular ITU standard the Line-in signal complies. This determination is made in accordance with the method illustrated in a flowchart provided in FIG. 6a and 6b.

In the first step, each "cross-term" is summed together (STEP 601). Cross-terms are the values of the "cross-term counters" 0, 5, 10 and 15. Note that these are the counters identified in FIG. 5 along the top-right to bottom-left diagonal. Also, note that these counters represent quadbits in which the first dibit represents a quadrant that is diagonally across from the quadrant represented by the second dibit. That is, each count held in counters 3, 6, 9, and 12 indicates that the I and Q components of the Line-in signal have each changed sign from one sample to a next sample. The reason the cross-terms are summed will become clear from the discussion below.

Next, each "left/right term" is summed together (STEP 603). Left/right terms are the values of the "left/right counters" 1, 4, 11, and 14 which indicate a transition from a first quadrant to a second quadrant that is either to the left or to the right of the first quadrant, as shown in FIG. 4. For example, the value of counter 1 indicates that the Line-in signal transitioned from $Q_1$ to $Q_0$ (i.e., the next quadrant to the right of $Q_1$). That is, the I and Q components of the Line-in signal were negative and positive, respectively (i.e., in the second quadrant $Q_1$), during a first sample time, and then were positive and positive, respectively (i.e., in the first quadrant $Q_0$) in a second sample time. The reason the left/right terms are summed will become clear from the discussion below.

Next, the total number of left/right terms is added to the total number of cross-terms. If this total is within a predetermined range, then the type of modulation is known. If the total number of cross-terms and left/right terms is in the range of 23–25 (STEP 605), then the modulation is known to conform to either V.32 or V.32 bis. That is, if the Line-in signal oscillates between a first quadrant and a second adjacent quadrant, the quadrants being to the right and left of each other (i.e., the Q component of the Line-in signal maintains the same sign), at a rate of 1200 Hz, then it can be assumed that the Line-in signal is transmitting symbol AC in accordance with V.32 or V. 32 bis. That is, when used to determine the particular ITU standard to which the Line-in signal conforms, the present invention preferably samples at a rate of 9,600 samples per second (i.e., at 104 μs intervals), and that the IQ quantizer preferably determines a dibit (and thus a quadbit) 96 times in a detection period. Accordingly, each detection period is 10 ms long. Accordingly, a count of 24 quadbits indicating a transition between a first and second adjacent quadrant indicates a rate of 12 complete cycles per detection period of 10 ms. Therefore, the rate is 1200 complete cycles per second. A complete cycle includes one transition to the adjacent quadrant, and one transition back to the starting quadrant. As will be understood by one skilled in the art, the conclusion that can be drawn is that the Line-in signal is transmitting AC symbols in accordance with V.32 or V.32 bis.

If the sum of the left/right terms and the cross-terms is not within the predetermined range, than a next step is performed to determine whether the Line-in signal is oscillating up and down between adjacent quadrants (i.e., the I component of the Line-in signal remains either positive or negative). This determination is made by summing the cross-terms with "up/down terms". Up/down terms are the values of those counters associated with quadbits that represent a transition from one quadrant to an adjacent quadrant, the adjacent quadrant being either above or below. That is, the values of "cross-term counters" 3, 6, 9, 12 (the cross-terms), are summed with the values of "up/down counters" 2, 7, 8, and 13 (the up/down terms) (STEP 609). The sum is then checked to determine whether the sum is within the predetermined range (i.e., preferably 23–25 when attempting to identify a V.32 Line-in signal) (STEP 611). If the sum is within the predetermined range, then the signal has been properly classified. In the present example, if the sum is in the range of 23–25, then the Line-in signal conforms to V.32 or V.32 bis.

Figure 3:
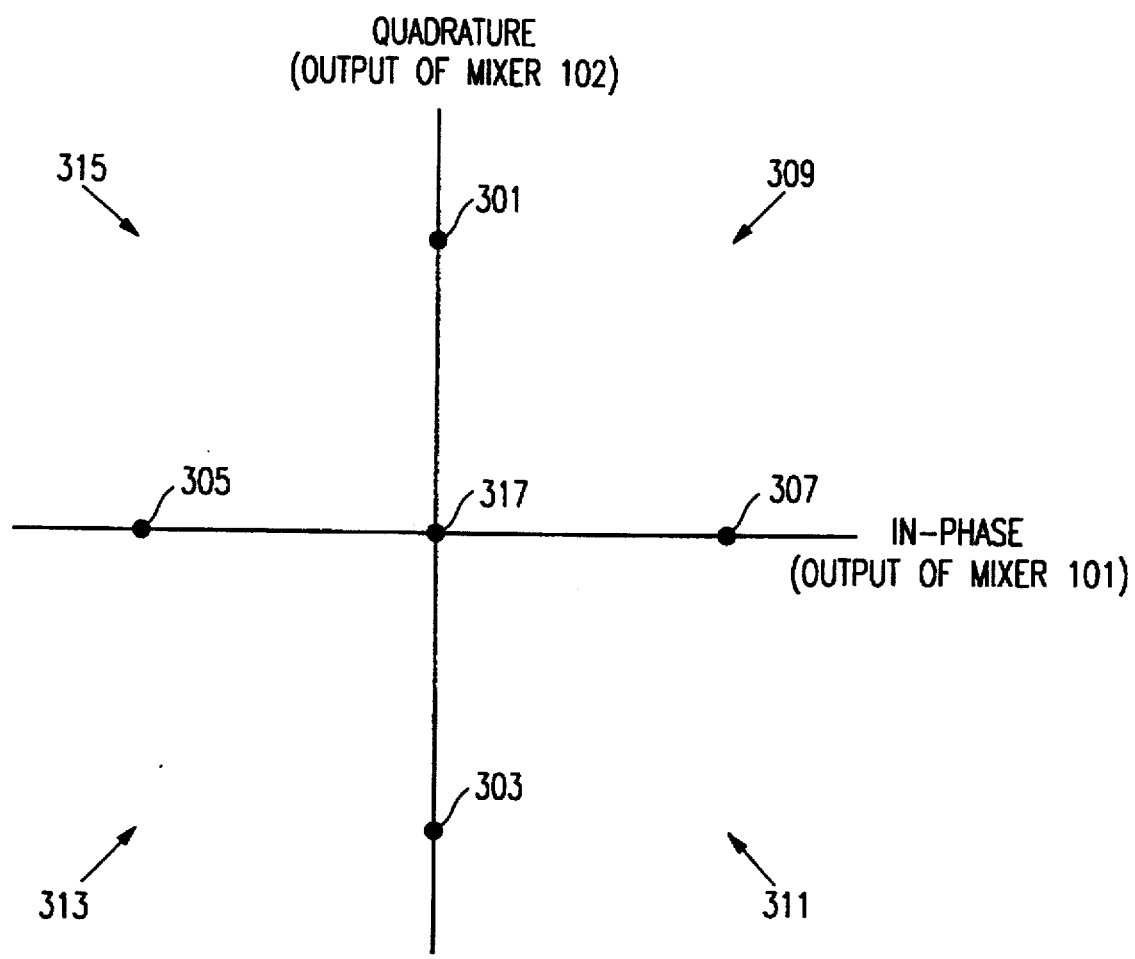
FIG. 3 is an I/Q plot in which the abscissa represents the amplitude of the in-phase component of the Line-in signal and the ordinate represents the quadrature component of the Line-in signal.

If the sum of STEP 611 is not in the predetermined range, then additional steps are taken to classify the Line-in signal. For example, "counter-clockwise terms" (CCW terms) are summed. CCW terms are the values of each "CCW counter" associated with a quadbit that indicates a rotation about an origin 317 of an I/Q plot of FIG. 3 in a CCW direction. Accordingly, the values of the CCW counters 2, 4, 13, and 11 are summed to generate a "CCW SUM" (STEP 615). The values of each "CW counter" associated with quadbits that indicate a rotation about the origin 317 in a CW direction (i.e., the "CW terms") are summed to generate a "CW SUM" (STEP 616).

The CW SUM is subtracted from the CCW SUM to generate a "DIFF" value. If the DIFF value is positive (STEP 617), then the DIFF value is checked against a predetermined range of values. For example, if the DIFF value is in the range of 5 to 7 (STEP 619), then the Line-in signal has a carrier frequency that is in the range of 1675 to 1625 Hz. The Line-in signal is then classified as a V.21 signal.

The relationship between the DIFF value and the frequency of the Line-in signal can be understood by recognizing that the DIFF value is collected over a 10 ms detection period. Therefore, if the DIFF value is equal to 5, then each increment occurred over a 10 ms/5=2 ms period (assuming that the time intervals between each are constant). Therefore, the frequency at which the five counts occurred is 1/.002=500 per second. Each count represents one transition from one quadrant to another. Since it takes four such transitions (i.e., one complete rotation) to complete one cycle for either the I or the Q components, the frequency of the I and Q components is 500/4=125 Hz. Since the I and Q components are the output from the phase detectors 101, 102, this frequency is the difference between each reference frequency (1800 Hz) and the Line-in frequency. Accordingly, the Line-in frequency is 1800−125=1675 Hz. Likewise, if the DIFF is 7, then the Line-in frequency is [1/(10 ms/7)]/4=175 Hz. Accordingly, if the DIFF is in a range of 5–7, then the Line-in frequency is in the range of 1675–1625. If the Line-in frequency is in the range of 1675–1625, then the Line-in signal is classified by the present invention as a V.21 signal, which is characterized by the 1650 mark tone.

If the Line-in frequency is not in the range of 1675–1625, then a range of 1250–1350 is checked. If the DIFF value is in the range of 18–22 (STEP 621), then the Line-in signal is classified as conforming to V.23. If the DIFF value is in the range of −16 to −20, then the Line-in signal is classified as a V.22 signal (STEP 623). If the DIFF value is not in the range of −16 to −20, then the Line-in signal cannot be classified and the Signal Classifier 111 indicates the failure to classify the Line-in signal (STEP 625).

It will be understood that while the present invention has been described primarily in terms of an application for determining the ITU standard to which a Line-in signal conforms, the present invention may be used to classify any Line-in signal which has been phase modulated, and which has either a characteristic frequency, or which has a characteristic symbol pattern that can be detected by analyzing the pattern of transitions from one phase relationship to another. For example, in an alternative embodiment of the present invention a 6-bit sextibit may be used which concatenates three dibits to indicate the path of a Line-in signal over three sample periods. Accordingly, 64 counters (one per 6-bit value) are provided in order to determine the number of times the Line-in signal performs each particular three quadrant pattern. This concept may be extended to any practical length by allocating a sufficient number of counters. In the preferred embodiment of the present invention, the counters are maintained in a general purpose memory accessible to a general purpose processor within the Signal Classifier 111. In accordance with one alternative embodiment of the present invention, the counters of the present invention may be hardware counters.

A number of embodiments of the present invention have been described. Nevertheless, it will be understood that various modifications may be made without departing from the spirit and scope of the invention. For example, the present invention is described as using a histogram "processor" and a classifier "processor". In accordance with the present invention, these devices may be programmable microprocessors, state machines, or dedicated hardware. Furthermore, the present invention is primarily described in the context of an embodiment in which ITU modulation schemes are being detected. However, there are numerous situations in which the present inventive classification method and apparatus may be used. Accordingly, the particular use made of the present invention should not be considered a limitation on the present invention, unless specifically limited by the appended claims. Furthermore, while the particular signal space described herein is an IQ signal space. The Area Indicators may identify an area within an alternative signal space. For example, a signal space of frequency verses amplitude may be defined. The Area Indicators would identify a particular area within the frequency amplitude signal space. Accordingly, the Transition Indicators indicate a transition from a first signal space area to a second signal space area. These transitions may be counted in order to classify a signal. Alternatively, the signal space may be defined in any other manner which allows at least two characteristics of a signal to be plotted with respect to time. Still further, a number of different demodulators may be used in the present inventive method and apparatus to supply the present invention with an indication of the particular phase state of the input signal. Furthermore, in an alternative embodiment of the present invention, any one of a number of different types of "counters" may be used to maintain the number of times the input signal transitions from one particular phase state to another.

Accordingly, it is to be understood that the invention is not to be limited by the specific illustrated embodiment, but only by the scope of the appended claims.

We claim:

1. A signal classification system for analyzing characteristics of an input signal having associated phase transition indicators, each phase transition indicator indicating a relationship between the characteristics of the input signal during at least two points in time, including:
   (a) a plurality of counters, each having count values, and each being associated with a unique phase transition indicator;
   (b) a controller, coupled to the plurality of counters and configured to be coupled to an external device for:
      (1) receiving phase transition indicators from the external device;
      (2) incrementing each counter associated with each phase transition indicator received from the external device.

2. The signal classification system of claim 1, wherein each transition indicator comprises two area indicators.

3. The signal classification system of claim 1, wherein the transition indicators are quadbits comprised of two dibits, each dibit indicating the presence of the input signal within one of four quadrants within a signal space.

4. A signal classification system for analyzing phase and frequency of an input signal having associated quadrature and in phase components, each component having an amplitude indicative of the relative phase of the input signal with respect to a reference signal, including:
   (a) a plurality of counters, each having count values, and each counter being associated with a change in phase from one predetermined phase state to another predetermined phase state; and
   (b) a controller, configured to be coupled to an external device, and to the plurality of counters, for:
      (1) receiving from the external device, indications of the amplitude of the quadrature component and the in-phase component of the input signal;

(2) determining, from the indications of the amplitudes of the quadrature and in-phase components, a series of consecutive phase states, each phase state associated with the amplitudes of one pair of quadrature and in-phase components at one point in time;

(3) incrementing the counter associated with a change in phase from a first phase state of a pair of two consecutive phase states from among the series of consecutive determined phase states to a second phase state of the pair.

5. The signal classification system of claim 4, wherein:

(a) the amplitude of the quadrature component and the in-phase component may have either a positive polarity or a negative polarity;

(b) the polarity of the quadrature component and the polarity of the in-phase component define the state of a dibit which represents one of four possible phase states of the input signal with respect to the phase of the reference signal; and (c) a plurality of dibits are concatenated to form a quadbit, each quadbit being associated with a unique one of the plurality of counters.

6. The signal classification system of claim 5, wherein the dibit is a two digit binary number, the state of one digit indicating whether the amplitude of the in-phase component is positive or negative, and the state of the other digit indicating whether the amplitude of the quadrature component is positive or negative.

7. The signal classification system of claim 5, wherein the controller classifies the input signal based upon the count values of at least one of the plurality of counters.

8. The signal classification system of claim 7, wherein the plurality of counters includes cross-term counters, and left/right counters, and wherein the controller classifies the input signal by:

(a) generating a first sum by adding the count values of each cross-term counter and left/right counter; and (b) if the first sum is within a first predetermined range, then generating a first indication.

9. The signal classification system of claim 8, wherein the plurality of counters further includes up/down counters and the controller further classifies the input signal by:

(a) generating a second sum by adding the count values of each cross-term counter and each up/down counter; and (b) if the second sum is within a second predetermined range, then generating a second indication.

10. The signal classification system of claim 9, wherein the plurality of counters further includes diagonal counters and the controller further classifies the input signal by:

(a) verifying that the count value of at least two of the diagonal counters are zero; and (b) if at least two of the diagonal counters are zero, then generating a third indication.

11. The signal classification system of claim 10, wherein the plurality of counters further includes clockwise counters and counter clockwise counters, and the controller further classifies the input signal by:

(a) generating a third sum by adding the count values of each counter clockwise counter;

(b) generating a fourth sum by adding the count value of each clockwise counter;

(c) generating a first difference by subtracting the fourth sum from the third sum; and (d) if the first difference is in a third predetermined range, then generating a fourth indication.

12. A signal classification system for analyzing phase and frequency of an input signal having a quadrature component and an in-phase component, each component having an amplitude, including:

(a) a demodulator for receiving an input signal, a first reference signal, and a second reference signal, and for outputting a quadrature component and an in phase component indicative of the relative phase of the input signal with respect to each of the first and second reference signals;

(b) a plurality of counters, each having count values, and each counter being associated with a change in phase from one predetermined phase state to another predetermined phase state; and (c) a controller, configured to be coupled to the modulator and to the plurality of counters, for:

(1) receiving from the modulator the quadrature component and the in-phase component of the input signal;

(2) determining, from the quadrature and in-phase components, a series of consecutive phase states, each phase state associated with the amplitudes of one pair of quadrature and in-phase components at a point in time;

(3) incrementing the counter associated with a change in phase from a first phase state of a pair of two consecutive phase states from among the series of consecutive determined phase states to a second phase state of the pair.

13. The signal classification system of claim 12, wherein:

(a) the amplitude of the quadrature component and the in-phase component may have either a positive polarity or a negative polarity;

(b) the polarity of the quadrature component and the polarity of the in-phase component define the state of a dibit which represents one of four possible phase states of the input signal with respect to the phase of the reference signals; and (c) a plurality of dibits are concatenated to form a quadbit, each quadbit being associated with a unique one of the plurality of counters.

14. The signal classification system of claim 13, wherein the dibit is a two digit binary number, the state of one digit indicating whether the amplitude of the in-phase component is positive or negative, and the state of the other digit indicating whether the amplitude of the quadrature component is positive or negative.

15. The signal classification system of claim 13, wherein the controller classifies the input signal based upon the count values of at least one of the plurality of counters.

16. The signal classification system of claim 15, wherein the plurality of counters includes cross-term counters, and left/right counters, and wherein the controller classifies the input signal by:

(a) generating a first sum by adding the count values of each cross-term counter and left/right counter; and (b) if the first sum is within a first predetermined range, then generating a first indication.

17. The signal classification system of claim 16, wherein the plurality of counters further includes up/down counters and the controller further classifies the input signal by:

(a) generating a second sum by adding the count values of each cross-term counter and each up/down counter; and (b) if the second sum is within a second predetermined range, then generating a second indication.

18. The signal classification system of claim 17 wherein the plurality of counters further includes diagonal counters and the controller further classifies the input signal by:

(a) verifying that the count value of at least two of the diagonal counters are zero; and (b) if at least two of the diagonal counters are zero, then generating a third indication.

19. The signal classification system of claim 18 wherein the plurality of counters further includes clockwise counters and counter clockwise counters, and the controller further classifies the input signal by:

(a) generating a third sum by adding the count values of each counter clockwise counter;

(b) generating a fourth sum by adding the count value of each clockwise counter;

(c) generating a first difference by subtracting the fourth sum from the third sum; and (d) if the first difference is in a third predetermined range, then generating a fourth indication.

20. The signal classification system of claim 19, wherein:

(a) the first and second reference signals have a frequency of about 1800 Hz;

(b) the input signal is in a first phase state the amplitude of both the quadrature component and the in-phase component are positive;

(c) the input signal is in a second phase state the amplitude of the quadrature component is positive and the amplitude of the in-phase component is negative;

(d) the input signal is in a third phase state the amplitude of the quadrature component is negative and the amplitude of the in-phase component is positive;

(e) the input signal is in a fourth phase state the amplitude of the quadrature component is negative and the amplitude of the in-phase component is negative;

(f) the controller increments a cross-term counter whenever the input signal changes phase such that a transition occurs from:

(1) the first to the fourth phase state;
(2) the second to the third phase state;
(3) the third to the second phase state; or
(4) the fourth to the first phase state;

(g) the controller increments a right/left counter whenever the input signal changes phase such that a transition occurs from:

(1) the first to the second phase state;
(2) the second to the first phase state;
(3) the third to the fourth phase state; or
(4) the fourth to the third phase state;

(h) the controller increments an up/down counter whenever the input signal changes phase such that a transition occurs from:

(1) the first to the third phase state;
(2) the second to fourth phase state;
(3) the third to first phase state; or
(4) the fourth to second phase state;

(i) the controller increments a clockwise counter whenever the input signal changes phase such that a transition occurs from:

(1) the first to the third phase state;
(2) the second to first phase state;
(3) the third to fourth phase state; or
(4) the fourth to second phase state; and (j) the controller increments a counter clockwise counter whenever the input signal changes phase such that a transition occurs from:

(1) the first to the second phase state;
(2) the second to fourth phase state;
(3) the third to first phase state; or
(4) the fourth to third phase state.

21. A method for analyzing phase and frequency of an input signal having associated quadrature and in phase components, each component having an amplitude indicative of the relative phase of the input signal with respect to a reference signal, using a signal classification system having a plurality of counters, each having count values, and each counter being associated with a change in phase from one predetermined phase state to another predetermined phase state, the signal classification system also having a controller, configured to be coupled to an external device, and to the plurality of counters, including the steps of:

(a) receiving from the external device, indications of the amplitude of the quadrature component and the in-phase component of the input signal;

(b) determining, from the indications of the amplitudes of the quadrature and in-phase components, a series of consecutive phase states, each phase state associated with the amplitudes of one pair of quadrature and in-phase components at a point in time;

(c) incrementing the counter associated with a change in phase from a first phase state of a pair of two consecutive phase states from among the series of consecutive determined phase states to a second phase state of the pair.

22. The method of claim 21, wherein the amplitude of the quadrature component and the in-phase component may have either a positive polarity or a negative polarity, further including the steps of:

(a) defining the state of a dibit which represents one of four possible phase states of the input signal with respect to the phase of the reference signal by the polarity of the quadrature component and the polarity of the in-phase component; and (b) concatenating a plurality of dibits to form a quadbit, each quadbit being associated with a unique one of the plurality of counters.

23. The method of claim 22, wherein the dibit is a two digit binary number, further including the step of indicating the state of one digit based upon whether the amplitude of the in-phase component is positive or negative, and the state of the other digit base upon whether the amplitude of the quadrature component is positive or negative.

24. The method of claim 23, classifying the input signal based upon the count values of at least one of the plurality of counters.

25. The method of claim 24, wherein the plurality of counters includes cross-term counters, and left/right counters, and classifying the input signal by:

(a) generating a first sum by adding the count values of each cross-term counter and left/right counter; and (b) if the first sum is within a first predetermined range, then generating a first indication.

26. The method of claim 25, wherein the plurality of counters further includes up/down counters and further classifying the input signal by:

(a) generating a second sum by adding the count values of each cross-term counter and each up/down counter; and (b) if the second sum is within a second predetermined range, then generating a second indication.

27. The method of claim 26, wherein the plurality of counters further includes diagonal counters and further classifying the input signal by:
   (a) verifying that the count value of at least two of the diagonal counters are zero; and
   (b) if at least two of the diagonal counters are zero, then generating a third indication.

28. The method of claim 27, wherein the plurality of counters further includes clockwise counters and counter clockwise counters, and further classifying the input signal by:

(a) generating a third sum by adding the count values of each counter clockwise counter;
   (b) generating a fourth sum by adding the count value of each clockwise counter;
   (c) generating a first difference by subtracting the fourth sum from the third sum; and
   (d) if the first difference is in a third predetermined range, then generating a fourth indication.

* * * * *